(12) United States Patent
Myers et al.

(10) Patent No.: US 7,735,066 B1
(45) Date of Patent: Jun. 8, 2010

(54) DEBUGGING INTERFACE

(75) Inventors: Brad A. Myers, Pittsburgh, PA (US); Andrew J. Ko, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1024 days.

(21) Appl. No.: 11/246,331

(22) Filed: Oct. 7, 2005

Related U.S. Application Data

(60) Provisional application No. 60/617,314, filed on Oct. 8, 2004.

(51) Int. Cl.
G06F 9/44 (2006.01)
(52) U.S. Cl. .................. 717/125; 717/128; 717/130
(58) Field of Classification Search .................. 717/125
See application file for complete search history.

(56) References Cited

U.S. PATENT DOCUMENTS

| | | | | |
|---|---|---|---|---|
| 4,589,068 | A * | 5/1986 | Heinen, Jr. ................... | 717/127 |
| 5,732,273 | A * | 3/1998 | Srivastava et al. ........... | 717/128 |
| 6,128,774 | A | 10/2000 | Necula et al. | |
| 6,658,653 | B1 * | 12/2003 | Bates et al. .................. | 717/131 |
| 6,788,933 | B2 | 9/2004 | Boehmke et al. | |
| 7,047,442 | B2 * | 5/2006 | Sutton ......................... | 714/25 |
| 7,110,936 | B2 * | 9/2006 | Hiew et al. .................... | 703/22 |
| 7,266,809 | B2 * | 9/2007 | Tsubata et al. ............... | 717/129 |
| 7,353,427 | B2 * | 4/2008 | Bates et al. ................... | 714/38 |
| 2004/0078784 | A1 * | 4/2004 | Bates et al. .................. | 717/129 |

OTHER PUBLICATIONS

Mikhail Auguston, Clinton Jeffery, Scott Underwood, A Framework for Automatic Debugging, Dept. of Computer Science, New Mexico State University, NMSU TR-CS-004/2002, pp. 1-10.

Alan Blackwell, Margaret Burnett, Applying Attention Investment to End-User Programming, Proceedings of the IEEE 2002 Symposia on Human Centric Computing Languages, 2002, pp. 1-3.

J. S. Briggs, S. D. Jamieson, G. W. Randall, I. C. Wand, Task time lines as a debugging tool, ACM Ada Letters, Mar./Apr. 1996, pp. 50-69, vol. XVI, No. 2.

(Continued)

*Primary Examiner*—Wei Y Zhen
*Assistant Examiner*—Phillip H Nguyen
(74) *Attorney, Agent, or Firm*—Thorp Reed & Armstrong LLP; Darren E. Wolf

(57) ABSTRACT

A software tool and method is provided in which a user can ask questions about their computer programs. As the subject program is executed, information is collected about the units of code that are executed and the changes to data. The user can pause the program, for example by pressing a button labeled "Why", which will prompt the user to select what they want to ask about. For example, the user can ask about why units of code did or did not get executed. The tool and method provide answers that can be in the form of prepared statements and interactive data and control flow visualizations that show the values of data and the particular units of code that caused the execution to occur or not occur. The user can ask further questions using the visualization.

20 Claims, 5 Drawing Sheets

OTHER PUBLICATIONS

Simon P. Davies, Models and theories of programming strategy, Int. J. Man-Machine Studies (1993) 39, 1993 Academic Press Limited, pp. 237-267.
Paul Gestwicki, Bharat Jayaraman, Interactive Visualization of Java Programs, Proceedings of the IEEE 2002 Symposia on Human Centric Computing Languages and Environments (HCC'02) 2002, pp. 1-10.
David J. Gilmore, Models of debugging, Acta Psychologica 78, 1991, pp. 151-172, North-Holland, Elsevier Science Publishers B.V.
T. R. G. Green, M. Petre, Usability Analysis of Visual Programming Environments: A 'Cognitive Dimentions' Framework, Journal of Visual Languages and Computing (1996) 7, pp. 131-174, 1996 Academic Press Limited.
T. R. G. Green, Cognitive Dimensions of Notations, (1989) People and Computers V, Cambridge, UK; Cambridge University Press, pp. 443-460.
Colleen Kehoe, John Stasko and Ashley Taylor, Rethinking the evaluation of algorithm animations as learning aids: an observational study, Int. J. Human-Computer Studies (2001) 54, pp. 265-284, Academic Press.
Andrew J. Ko and Brad A. Myers, Development and Evaluation of Model of Programming Errors, Proceedings of the IEEE 2003 Symposia on Human Centric Computing Languages and Environments (HCC'03), Auckland, New Zealand, October 28-31, pp. 1-8, IEEE.
Raimondas Lencevicius, URS Holzle, Ambuj K. Singh, Dynamic Query-Based Debugging of Object-Oriented Programs, Automated Software Engineering, 10, pp. 39-74, 2003, 2003 Kluwer Academic Publishers, Manufactured in The Netherlands.
Henry Lieberman, The Debugging Scandal and What to Do about It, Communications of the ACM, Apr. 1997/vol. 40. No. 4, pp. 27-29.
Gregg Rothermel, Mary Jean Harrold and Jeinay Dedhia, Regression Test Selectio for C++ Software, Journal of Software Testing, Verification, and Reliability, V. 10, No. 2, Jun. 2000, pp. 1-35.
RTI, Planning Report 02-3, The Economic Impacts of Inadequate Infrastructure for Software Testing, Final Report May 2002.
Andreas Zeller, Isolating Cause-effect Chains from Computer Programs, SIGSOFT 2002/FSE-10, Nov. 18-22, 2002, Charleston, SC, USA, pp. 1-10.
Xiangyu Zhang, Rajiv Gupta and Youtao Zhang, Precise Dynamic Slicing Algorithms, The University of Arizona, Dept. of Computer Science, Tucson, Arizona 85721, 2003 IEEE, pp. 319-329.
Simon P. Davis, Display-Based Probelm Solving Strategies in Computer Programming, Empirical Studies of Programmers: Sixth Workshop, Published by Intellect Books, 1996, ISBN 1567502628, 9781567502626.
Hugh Beyer, Karen Holtzblatt, Contexual Deisgn, Defining Customer-Centered Systems, 1998, pp. 29-39, Morgan Kauffmann Publishers.
Anneliese Von Mayrhauser and A. Marie Vans, Program Undertanding Behavior During Adaptation of Large Scale Software, Computer Science Department, Colorado State University, Fort Collins, CO 80523, 1998, pp. 1-9.
James Reichwein, Gregg Rothermel, Margaret Burnett, Slicing Spreadsheets: An Integrated Methodology for Spreadsheet Testing and Debugging, Proceedings of the 2nd Conference on Domain-Specific Languages, Austin, TX, Oct. 3-5, 1999, pp. 25-38.
Pablo Romero, Richard Cox, Benedict Du Boulay, Rudi Lutz, A survey of external representations employed in object-oriented programming environments, Journal of Visual Languages and Computing 14 (2003), pp. 387-419, Elsevier LTD.
Frank Tip, A Survey of Program Slicing Techniques, CWI, P.O. Box 94079, 1090 GB Amsterdam, The Netherlands, 1995, pp. 1-58.
Internet article: Mike Crissey, Debugging for Dummies, CBS News, CBSNews.com, Jul. 27, 2004, pp. 1-2.
Internet article: U.S. Commercial Service Your Global Business Partner, , Software—Industry Profile, BuyUSA, pp. 1-3 (URL: http://www.buyusainfo.net/info.cfm?id=32605
&keyx=348EB12C2CC324D9C6438ACF0953FCED&dbf=
mrsearch1& loadnav=no&archived=yes&addid=yes), report dated Dec. 7, 2000.
Internet article: Wylie Wong, Software Toolmakers Struggle in Shrinking Market, CNET News, Sep. 7, 1999, pp. 1-4 (URL: http://news.cnet.com/Software-toolmakers-struggle-in-shrinking-market/2100-1001_3-230696.html).
Internet article: Amateur/Independent Game Development Tools Market 2004-2008, Research and Markets, 2004-2008, pp. 1-10 (URL: www.researchandmarkets.com/reports/45530), reference undated, printed Oct. 8, 2008.
Internet article: Market Dynamics: The Testing Tools Market Computerwire MarketWatch, May 26, 2004, Issue 034, pp. 1-16 (URL: www.computerwire.com).
Internet article: Java Integrated Development Environments (IDEs) and Editors, Java Programming Resources, pp. 1-4 (URL: http://www.apl.jhu.edu/-hall/java/IDEs.html), reference undated, printed Oct. 8, 2008.
Internet article: Rob Wright, Software Tools Storm The Market, Chanelweb, Jan. 31, 2002, pp. 1-8 (URL: http://www.cm.com/it-channel/18827872).
Internet article: Martin Lamonica, Eclipse Llights Up Java Crowd, CNET News, Feb. 28, 2005, pp. 1-2 (URL: http://news.cnet.com/Eclipse-lights-up-Java-crowd/2100-7344_3-5590847.html).
Internet article: Andrew Binstock, The End Of IDE Competition, SDTimes on the Web, Sep. 15, 2004, pp. 1-5 (URL: http://www.sdtimes.com/SearchResult/28154).
Internet article: Chris Lanfear and Steve Balacco, The Embedded Software Strategic Market Intelligence Program, WindowsForDevices.com, Mar. 6, 2003, pp. 1-5 (URL: http://www.windowsfordevices.com/articles/AT6475045334.html).
Internet article: John P. Desmond, 2004 Software 500: Growth Came In Segments, The Software 500, Oct. 2004, pp. 1-4 (URL: http://www.softwaremag.com/L.cfm?Doc=2004-09/2004-09software-500).
Internet article: Developers: We Need More Tools!, DataBased Advisor.Magazine, pp. 1-4 (URL: http://my.advisor.com/doc/06257), Mar. 29, 2000; doc # 06257.
Internet article: Kevin Taylor, Top 7 Java IDEs, Focus on Java, pp. 1-2 (URL: http://web.archive.org/web/20051220233845/java.about.com/od/idesandeditors/tp/top_ides.htm), reference undated, printed Oct. 8, 2008.
Internet article: Jacob Lehraum and Bill Weinberg, IDE evolution continues beyond Eclipse, EETimes, Jun. 7, 2004, pp. 1-4 (URL: http://www.eetimes.com/showArticle.jhtml?articleID=21400991).
Internet article: Glen Kunene, Eclipse: The Last IDE You'll Ever Need?, Devx, pp. 1-2 (URL: http://www.devx.com/opensource/Article/27502/1954), reference undated, printed Oct. 8, 2008.

* cited by examiner

DEBUGGING INTERFACE

CROSS REFERENCE TO RELATED APPLICATIONS

This application claims priority from U.S. Provisional Patent Application No. 60/617,314, filed Oct. 8, 2004, and which is incorporated herein by reference.

STATEMENT REGARDING FEDERALLY SPONSORED RESEARCH AND DEVELOPMENT

This research was funded in part by the National Science Foundation under grants IIS-0329090 and ITR-0324770. The government may have certain rights in this invention.

FIELD OF THE INVENTION

This invention relates to apparatuses, methods, and systems for debugging or otherwise interrogating or investigating software interactively, such as through asking specific questions about the software using menus.

BACKGROUND OF THE INVENTION

Among all programming activities, debugging still remains the most common and most costly. A recent study by the NIST found that software engineers in the U.S. spend 70-80% of their time testing and debugging, with the average error taking 17.4 hours to find and fix (Tassey, G., "The economic impacts of inadequate infrastructure for software testing." National Institute of Standards and Technology, RTI Project Number 7007.011, 2002). Software engineers blamed inadequate testing and debugging tools.

One reason for this might be that the feature sets of commercial debugging tools have changed little in the past 30 years: programmers' only tools for finding errors are still breakpoints, code-stepping, and print statements.

Research describes debugging as an exploratory activity aimed at investigating a program's behavior, involving several distinct and interleaved activities:

Hypothesizing what runtime actions caused failure;
Observing data about a program's runtime state;
Restructuring data into different representations;
Exploring restructured runtime data;
Diagnosing what code caused faulty runtime actions; and
Repairing erroneous code to prevent such faulty runtime actions.

Current debugging tools support some of these activities, while hindering others. For example, breakpoints and code-stepping support observation of control flow, but hinder exploration and restructuring; visualization tools help restructure data, but hinder diagnosis and observation.

There have been many attempts to design more useful debugging paradigms and tools, including automatic debugging, relative debugging, program slicing, and visualizations. For example, Lencevicius et al. discuss Query-Based Debugging [Lencevicius, R., Holzle, U., and Singh, A. K., "Dynamic query-based debugging of object-oriented programs," Journal of Automated Software Engineering, 10(1), 2003, 367-370], where programmers form textual queries on objects' runtime relationships. However, it forces programmers to guess what relationships might exist, and requires learning an unfamiliar query language. Briggs et al. discuss a task timeline [Briggs, J. S., et al., "Task time lines as a debugging tool," ACM SIGAda Ada Letters, XVI(2), 1996, 50-69] for debugging distributed Ada programs. Their visualization highlights a dynamic slice, but it does not relate runtime actions to code. Zeller's work on cause-effect chains and the AskIgor debugger [Zeller, A., "Isolating cause-effect chains from computer programs," International Symposium on the Foundations of Software Engineering, 2002, Charleston, S.C., 1-10] is a related diagnosis tool. However, Zeller's approach requires both a failed and successful execution of a program.

However, few of these have been shown to be usable, let alone to reduce debugging time. This is because debugging activity always begins with a question, and to use existing tools, programmers must struggle to map strategies for answering their question to the tools' limited capabilities. Furthermore, none of these tools support hypothesizing activities. If programmers have a weak hypothesis about the cause of a failure, any implicit assumptions about what did or did not happen at runtime will go unchecked. Not only do these unchecked assumptions cause debugging to take more time, but studies have shown that many errors are due to programmers' false assumptions in the hypotheses they formed while debugging existing errors.

In two studies of both experts' and novices' programming activity, programmers' questions at the time of failure were one of two types: "why did" questions, which assume the occurrence of an unexpected runtime action, and "why didn't" questions, which assume the absence of an expected runtime action. There were three possible answers:

1. False propositions. The programmer's assumption is false. The answer to "Why didn't this button's action happen?" may be that it did, but had no visible effect.

2. Invariants. The runtime action always happens (why did), or can never happen (why didn't). The answer to our button question may be that an event handler was not attached to an event, so it could never happen.

3. Data and control flow. A chain of runtime actions led to the program's output. For example, a conditional expression, which was supposed to fire the button's action, evaluated to false instead of true.

Therefore, the need exists for a new debugging technique which allows programmers to directly ask the questions they naturally want to ask and receive appropriate answers in response.

SUMMARY OF THE INVENTION

The present invention is directed generally to a software tool that can be used, for example, to debug or otherwise investigate computer programs interactively. The computer programs which are the subject of the present application will be referred to as "subject programs". The present invention includes various apparatuses, methods, and systems for implementing such software tools. The present invention describes a new debugging paradigm called Interrogative Debugging (ID), in which programmers can ask questions such as "why did" and "why didn't" directly about a subject program's behavior, and view answers in terms of directly relevant runtime data. For example, if a programmer was testing a graphical button and observed that clicking it had no effect, an ID interface would allow her to ask, "Why didn't this button do anything?" By allowing questions about the subject program output, any implicit assumptions about what did or did not happen at runtime can be explicitly addressed in the answer.

To investigate the merits of ID, we designed a visualization called the "Whyline"—a Workspace that Helps You Link Instructions to Numbers and Events. By comparing six identical debugging scenarios from user tests with and without the Whyline, a study showed that the Whyline reduced debugging time by nearly a factor of 8, enabling programmers to complete 40% more tasks.

In one embodiment, the present invention includes a method for interrogating a subject program, comprising determining whether a unit of code of the subject computer program failed to execute, and providing an answer indicating why the unit of code failed to execute.

In another embodiment, the present invention includes a method for interrogating a subject program, comprising executing the subject program, recording a first unit of code responsible for a first data item changing, recording a second data item used by a second unit of code that executed, recording a third unit of code that caused the second unit of code to execute, pausing the execution of the subject program, prompting a user to select information related to the subject program, and providing an answer in response to the user selecting information related to the subject program, wherein the answer includes at least one of: units of code, data items, and prepared statements related to the information selected by the user.

In another embodiment, the present invention includes a computer software tool which, when executed, performs steps comprising executing a subject program, recording a first unit of code responsible for a first data item changing, recording a second data item used by a second unit of code that executed, recording a third unit of code that caused the second unit of code to execute, pausing the execution of the subject program, prompting a user to select information related to the subject program, and providing an answer in response to the user selecting information related to the subject program, wherein the answer includes at least one of: units of code, data items, and prepared statements related to the information selected by the user.

In another embodiment, the present invention includes a computer software tool which, when executed, performs steps comprising executing a subject program, recording a first unit of code responsible for a first data item changing, recording a second data item used by a second unit of code that executed, recording a third unit of code that caused the second unit of code to execute, pausing the execution of the subject program, prompting a user to select information related to the subject program, and providing an answer in response to the user selecting information related to the subject program, wherein the answer includes at least one of: units of code, data items, and prepared statements related to the information selected by the user.

Accordingly, the present invention provides for new debugging techniques, which reduce debugging time and increase the productivity of programmers. The present invention also provides tools which have applications beyond debugging, such as for investigating how unfamiliar programs work. Those and other advantages of the present invention will be described in more detail hereinbelow.

BRIEF DESCRIPTION OF THE DRAWINGS

For the present invention to be easily understood and readily practiced, embodiments will now be described, for purposes of illustration and not limitation, in which.

DETAILED DESCRIPTION OF THE INVENTION

The present invention will be described in terms of a software tool called the "Whyline" that can be used, for example, to debug computer programs. Before describing the Whyline's implementation, one embodiment of its design is illustrated through the following debugging scenario:

The user is creating a Pac-Man game world, and trying to make Pac shrink when the ghost is chasing and touches Pac. She plays the world and makes Pac collide with the ghost, but to her surprise, Pac does not shrink . . . .

Pac did not shrink because the user has code that prevents Pac from resizing after the big dot is eaten. Either the user did not notice that Pac ate the big dot, or she forgot about the dependency.

The Question Menu

Figure 1:
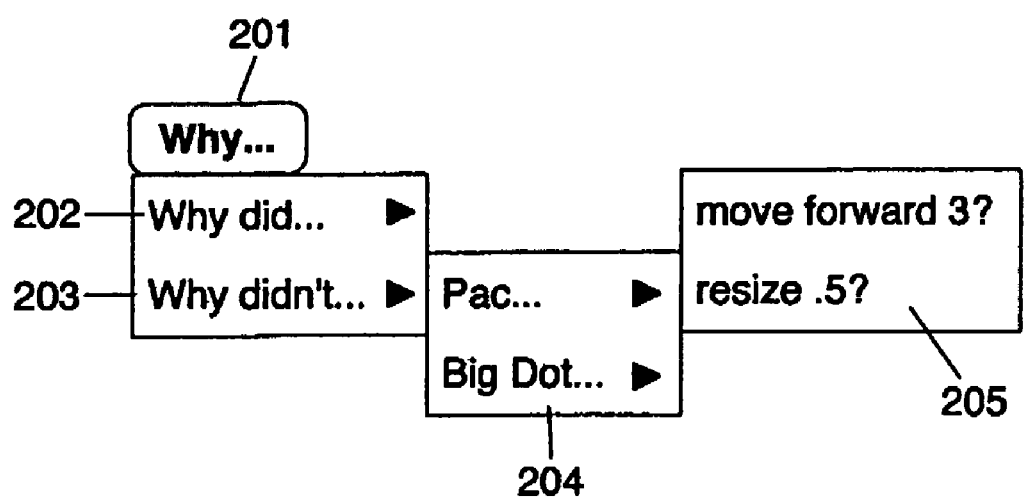
FIG. 1 is a screen representation of the "Why" question menu.

When the user played the world, she would see the subject program's output and animations. In this example, the user can select a button (referred to as the "why" button) to utilize the present invention. As shown in FIG. 1, the user presses the "why" button 201 after noticing that Pac did not shrink, and a menu appears with the items "why did" 202 and "why didn't" 203. If the user selects one of the "why did" or "why didn't" menus, then additional submenus are displayed. The submenus contain the objects in the world that were or could have been affected 204. The submenus may contain all objects, or only a subset of objects. For example, the submenus may contain only objects which have been acting on most recently, or other criteria may be used for selecting the objects in the submenus. Because the user expected Pac to resize after touching the ghost, the user selects the "Why didn't" 203 menu option, which provides the user with a submenu 204 including several objects that contain methods that were not executed. In this case, one of the options is the object "Pac . . . ", which the user selects. The user is next presented with another submenu identifying property changes and animations that could have happened 205, but didn't. An analogous set of menus would be presented to a user who selected the "why did" 202 menu option.

Many variations of the menus and submenus are possible. In one embodiment, the "Why" button is linked to a code editor and question answer area, shown in FIG. 2. When the user hovers the mouse over a menu item 205, the code that caused the output in question is highlighted and centered in the code area of the code editor 309.

The Answer

Figure 2:
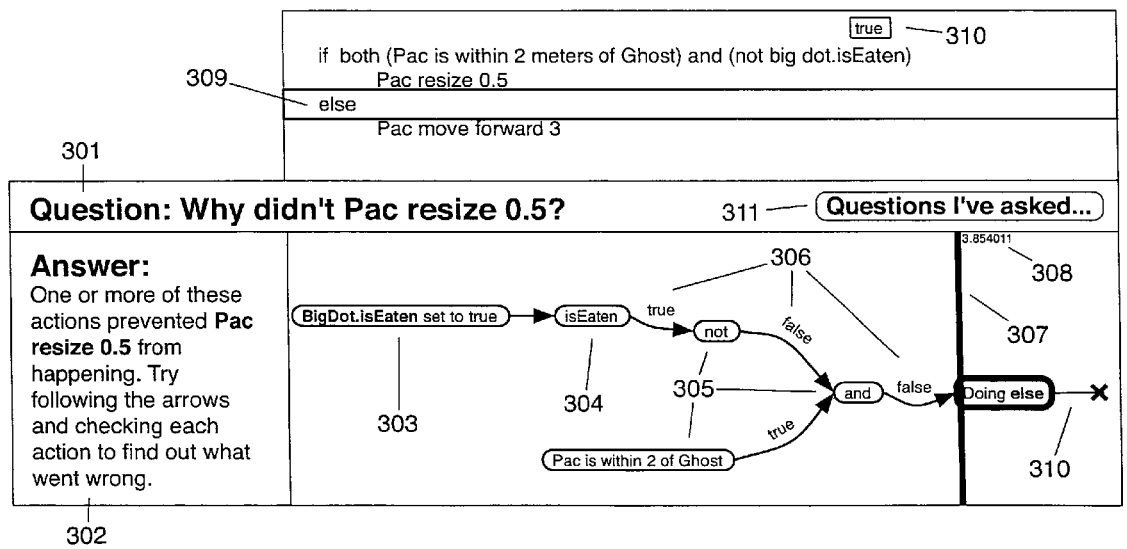
FIG. 2 is a screen representation of the code of the subject program and the visualization of the answer.

FIG. 2 illustrates a screen representation according to one embodiment of the present invention. The user asks "Why didn't Pac resize 0.5?". The Whyline answers the question by analyzing the runtime actions that did and did not happen, and provides the answer shown in FIG. 2. The question asked is shown at the top of the visualization pane 301, and a description of the answer 302 is shown to the visualization's left. The visualization itself combines both data flow and control flow items to explain the answer. The actions included are only those that prevented Pac from resizing: the predicate whose expression was false 305, the operators that formed the predicate's expression 304 and the actions that defined the properties used by the expression 303. By excluding unrelated actions, the system supports observation and hypothesizing by increasing the visibility of the actions that likely contain the fault. However, in other embodiments, more or less information may be displayed, and that information may be displayed in the same or different formats and orientations to that illustrated in FIG. 2.

The arrows show either data flow 306 or control flow 310 causality. Dataflow arrows 306 are labeled with the data used by the action to which they point. The arrows help the user follow the runtime system's computation and control flow.

Along the x-axis is event-relative time. Along the y-axis are event threads: this allows co-occurring control flow actions to be shown. The user interacts with the timeline by dragging the time cursor 307. Doing so changes all properties to their values at the time represented by the time cursor's location; this time 308 is displayed above the time cursor. This supports exploration of runtime data. When the user moves the cursor over an action, the action and the code that caused it become selected 309, supporting diagnosis and repair. These features allow the user to rewind, fast-forward, and even "scrub" the execution history, receiving immediate feedback about the state of the world. This exposes hidden dependencies between actions and data that might not be shown directly on the Whyline, and between properties' current values and program output.

Additional features and variations are also possible with the present invention. For example, to reduce the difficulties of exploration, the user can double-click on an action to ask, "what caused this to happen?" and actions causing the runtime action are added to the visualization. The user can also hover her mouse cursor over expressions in the code to see properties' current values and to evaluate expressions based on the current time 308. This improves the visibility of runtime data and supports progressive evaluation. Finally, the Whyline supports provisionality by making previous answers available through the "Questions I've Asked . . . " button 311. Although FIG. 2 illustrates that answer being provided in written form 302 along with a visualization to explain the answer, the answer is not limited to this form. Rather, providing an answer to the user may take many forms including text, graphics or visualizations, other forms, or combinations of forms. In addition, the information in the answer can also vary. For example, the answer may include references to units of code or data items, the answer may include prepared statements, the answer may include only information which did or did not happen, or the answer may include other information to assist the user.

Using these mechanisms, the user discovers her misperception using the Whyline:

"So this says Pac didn't resize because BigDot.is Eaten is true . . . . Oh! The ghost wasn't chasing because Pac ate the big dot. Let's try again without getting the big dot."

Without the Whyline, the misperception could have led to an unnecessary search for non-existent errors.

Implementation

The present invention is a software tool that may be used to debug the subject programs. It may be implemented using the Java programming language as part of a graphical, integrated software development environment that runs on Mac and PC operating systems. The invention can be implemented in many other forms, including as a stand-alone application or as a software plug-in for development environments such as Visual Studio, Eclipse, or Macromedia Flash. It can use any processor and operating system, such as Microsoft Windows, Macintosh or Unix, and can support any type of programming language, including object-oriented, procedural, functional, and graphical programming languages. The invention could be implemented with special hardware that might record the required information during execution so as to run programs quicker, or it may be implemented as part of an emulator or simulator, in order to support the monitoring of program execution.

In one embodiment, programs are implemented internally using a control flow graph (CFG), where expressions are represented as data flow graphs attached to nodes in a CFG. These graphs are constructed incrementally as programmers create and modify code to avoid having to build the graphs before program execution. At runtime, every execution of a CFG node is recorded as well as all assignments and uses of variables' values. These execution histories of actions are used at run-time to navigate the execution history based on the location of the time cursor.

Figure 3:
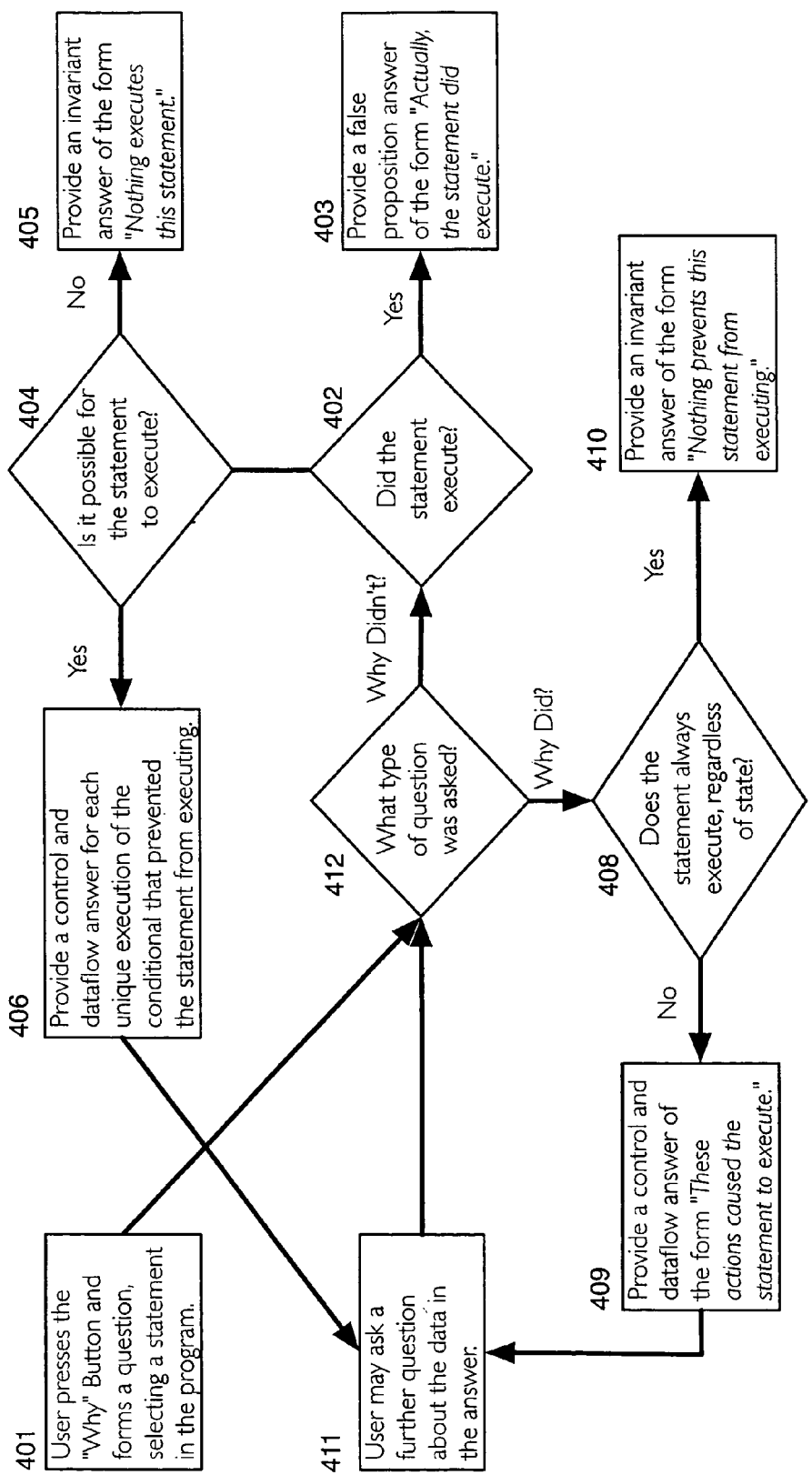
FIG. 3 is a flowchart illustrating one aspect of the present invention.

FIG. 3 is a flowchart illustrating one aspect of the present invention. As shown in FIG. 3, when the Why button is pressed, the system immediately generates the "Why did" and "Why didn't" menus 401. The "Why did" menu contains questions for each runtime action that was executed and each assignment of a variable. The "Why didn't" menu also contains these questions (so that the system may reveal false assumptions about runtime actions that actually did occur). In addition to what did occur, the "Why didn't" menu contains a question for each method that could have executed at runtime. This set of method calls is obtained by performing a static analysis of the subject program's code to determine all of the method calls in the subject program's source code. In addition to method calls, the "Why didn't" contains a question for each potential assignment of a variable. These potential assignments are obtained by performing a static analysis of all of the variable assignment statements in the subject program's source code. For discrete variables (such as Booleans or enumerated types), a question is provided for each possible value that the variable may be assigned. For continuous variables, one question is provided for each constant-valued assignment, along with one generic question in the form of "Why didn't X change?" where X is the continuous variable. Once the "Why did" and "Why didn't" submenus are constructed, the top-level menu is displayed on-screen so that the user may select the question they want to ask.

Once a question is selected, it is answered based on the process depicted in FIG. 3. First the system determines whether a "Why did" or "Why didn't" question was asked 412. When users ask a "Why didn't" question about some object's behavior, the question refers to a node in the program's CFG (some element of a program). To answer "Why didn't" questions, the system first checks if the node in question was in fact executed 402. If it was, an answer may be provided in the form of a prepared statement, such as "Actually, the statement did execute" and the system visualizes the set of runtime actions responsible for the execution of the node in question 403. If the node did not execute, the system checks if it was possible for the node to execute 404. It does this by checking if there are any incoming control flow edges into the node. If there are not, the system may provide an answer in the form of a different prepared statement, such as "Nothing executes this statement" 405. Finally, if the statement did not execute, but it could have executed, the system provides an answer consisting of all unique executions of the predicate node that prevented the node in question from executing, and the runtime actions causing each 406. Unique executions of a predicate are defined by the set of values used to evaluate a predicate's expression.

When users ask a "Why did" question about some object's behavior, the question refers to the most recent execution of a node in the CFG (an execution of some element of a program). To answer "Why did" questions, the system first checks if the statement will execute unconditionally 408. It does this by checking for incoming predicate nodes. If the statement will execute unconditionally, the system may provide an answer in the form of a prepared statement, such as "Nothing prevents this statement from executing" 410. If the statement conditionally executes, the system provides an answer in terms of the set of actions that caused the node in question to be executed 409.

For "Why did" answers, up to two predicates are included in the queried execution action's chain of causality, and any actions defining the properties used in the predicates' expressions. More or fewer execution actions may be included, although including more execution actions will decrease visibility. Any actions that are not shown can always be retrieved at the request of the user.

After viewing an answer that has an accompanying diagram (steps 406 and 409), users may then ask additional questions about the information in the diagram 411, which invokes the same answering process as described above.

Figure 4:
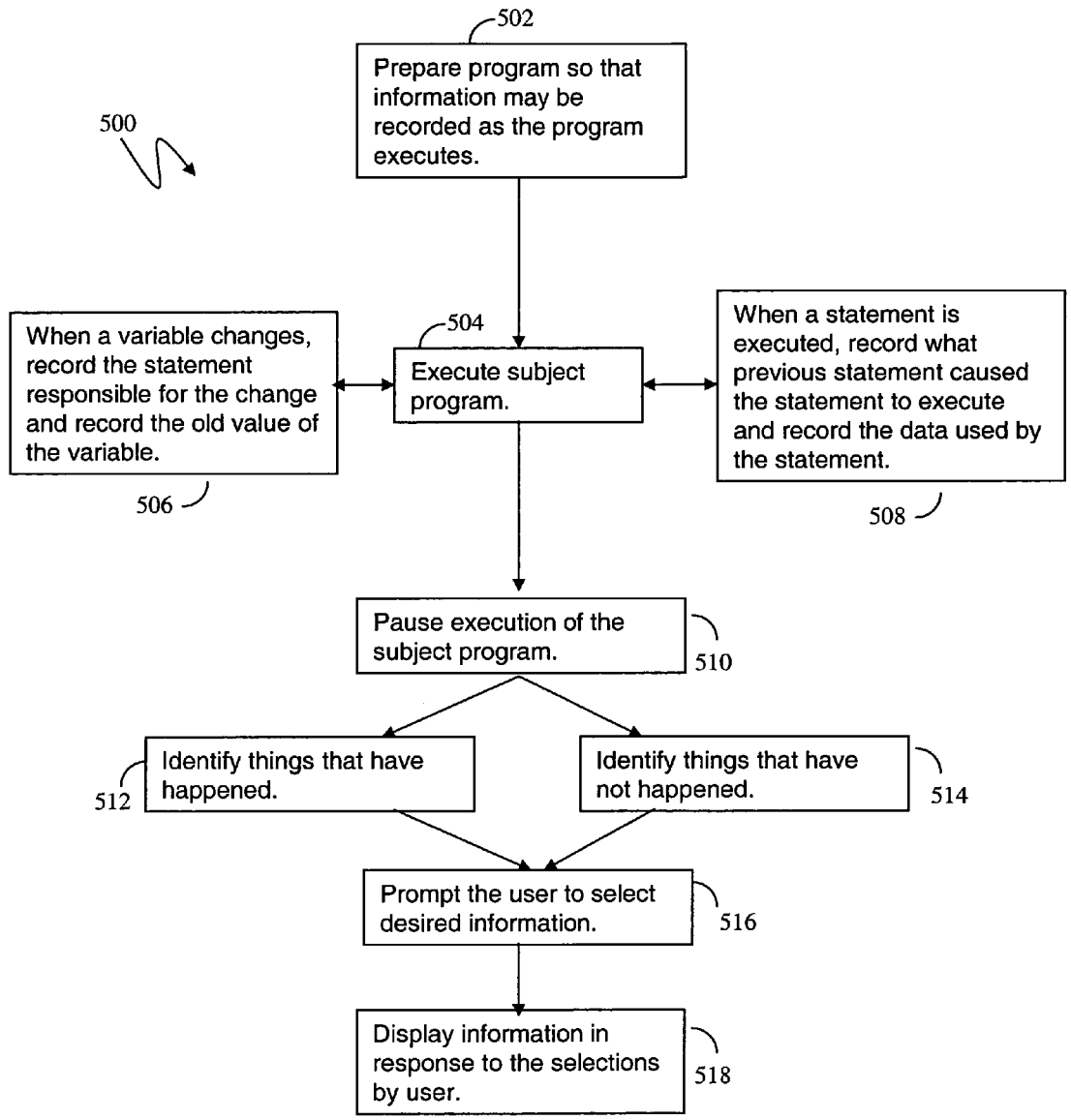
FIG. 4 is a flowchart illustrating another aspect of the present invention.

FIG. 4 is a flow chart 500 illustrating another aspect of the present invention showing how the question menus are constructed. The first step 502 is to instrument and analyze the subject program so that information may be recorded as it is executing. The subject program is instrumented incrementally as programmers create and modify code to allow the system to execute the program on demand. In alternative embodiments, this instrumentation could happen as a batch process that modifies the subject program's source code to record information, by a compiler that generates an instrumented executable that collects the information, or the information could be collected directly without instrumentation during execution by an interpreter, emulator or simulator. In step 504 the subject program is executed.

Step 506 shows that every time the value of a variable in the subject program changes during execution that certain information about that execution action is recorded. The precise information recorded may vary. For example, the statement responsible for the change may be recorded, but the previous value of the variable may not be recorded. In another embodiment, both the statement responsible for the change in the value of the variable and the previous value of the variable are recorded. Other information may also be recorded, such as the thread in which the statement was executed. This information may be recorded in memory while the program is executing, or it may be recorded to writable media as a log. Other embodiments may have variations in how such information is compressed to reduce the amount of information that must be recorded.

In step 508 a statement in the subject program has been executed and certain information about that action is recorded. In one embodiment, the action that caused that statement to execute is recorded, and the data used during the execution of that statement is recorded. For example, the statement might be part of a conditional, and the system would record what values were used that caused this statement to execute, and which statement was executed immediately prior to this statement.

Steps 506 and 508 may be repeated many times as the subject program is executed and changes occur. An example of steps 506 and 508 will now be provided in which variables and statements will be given labels (i.e., "first", "second", "third"). The example of the operation of steps 506 and 508 is as follows: when a "first" statement is executed which is an assignment statement, and changes the value of a "first" variable, the "first" statement will be recorded 506 as being responsible for that change; when a "second" statement executes which uses the value of a "second" variable, the "second" variable is recorded 508; and a "third" statement is recorded 508 because that third statement caused the "second" statement to execute. The labels used in the example are for the purpose of distinguishing between different statements, distinguishing between different variables, and identifying corresponding variables and statements. This example is illustrative and not limiting, and many other examples are possible with the present invention. For example, the labels (i.e., "first", "second", "third") may indicate the relative order in which actions occur, although the order may also be different than the labels. In addition, more or fewer statements and data may be recorded than is illustrated in this example. Furthermore, different labels may refer to different variables and statements, although this is not required. For example, the first variable and the second variable may be the same variable used two different times, or the first variable and the second variable may be two different variables. The same is true with the statements. The current embodiment is described with respect to imperative object-oriented programming languages that execute statements and store data in variables, but alternative embodiments could support other types of programming languages. For example, in a graphical program, the unit of code that is recorded might be a graphical program step instead of a statement. In a database language, the changes to data that are recorded might be changes to database tables. The description of the present invention in terms of statements and data represented by variables is for the purpose of illustrating particular embodiments of the present invention. However, the present invention applies broadly to "units of code", not just statements, and the present invention applies broadly to "data items", not just the data represented by variables.

In step 510 the execution of the subject program is paused. This may be as a result of a user intentionally pausing the execution of the subject program, for example, by hitting the "Why" button, clicking on a code fragment in the program editor, or by clicking on output from the program. The subject program may also be paused as a result of an unintentional interruption of the subject program, for example as a result of the program crashing, the result of the program reaching a breakpoint in the code, or result of some other occurrence or runtime action.

Although it may be possible to practice the present invention while the subject program is executing, it is generally preferred to stop the subject program, and the discussion of the present invention will assume that the subject program is stopped while performing the subsequent steps.

In step 512 the statements affecting the output of the program that have executed "recently" are identified. These are determined by analyzing the execution history collected in steps 506 and 508. Determining which of these to display will vary based on the number of statements that happened, the particular application of present invention, and the user preferences. For example, the user may be able to select which actions are sufficiently "recent" to be displayed. Alternatively, the user may identify other criteria to be used in determining which information is displayed, or the program editor may attempt to determine what statements might be relevant to the user's task.

In step 514, statements that the user might have expected to execute but did not actually execute are identified. These are determined from the program code from the analyses described in step 502. The tool identifies the branches of conditionals that might not have executed, event handlers that might not have executed, and any other statements affecting the program's output that might not have executed. All of these statements are included, regardless of whether they occurred during the execution of the program. As with step 512, determining what information is to be displayed will vary by programming language and user preferences.

In step 516, the user is prompted to select desired information. This prompt follows the user selecting the "why" button, or makes other subsequent selections after selecting the "why" button. The manner in which the user is prompted may take many forms. For example, the information may be accessed through a series of one or more levels of menus. The user is first presented with the options of asking "why did" something happen, or "why not". If the user selected to ask "why did" something happen, then the user will next see a menu listing objects that has recently changed and methods on those objects which have recently been executed as determined in step 512. If the user selects one of these items, the user will be presented with more specific information about the data or executed items.

Similarly, if the user selected to determine why something did not happen, the user will be presented with a menu listing things that have not happened recently, such as data that has not changed and units of code that have not been executed, as determined in step 514. Again one or more menus may follow as the user continues to make selections.

In other embodiments, the user may be presented with multiple levels of menus providing, for example, information with varying degrees of specificity. After the first menu, the user may be presented with the option of selecting from another menu. Alternatively, the user may be presented with other options. The user may move up and down the menus, viewing different information. The number of menus may vary, as well as the manner in which information is presented. For example, rather than initially choosing between "why" and "why not", the user may first select the unit of code, data, objects, or other information of interest. In addition, menus may not be used at all, but rather the information may be presented in a more graphical form or otherwise to allow the user to seek the information with or without menus.

Steps 512, 514, and 516 may be repeated multiple times as the user navigates different levels of menus or otherwise reviews information and requests additional information. In addition, although step 516 is illustrated as happening after steps 512 and 514, those steps may be performed in different orders. For example, the user might first indicate an object of interest, and then the system will identify things that did and did not happen specifically on that object. Other variations and changes are also possible.

In step 518, information selected by the user is displayed. This step 518 is illustrated as being performed after steps 512, 514, and 516 and it may be performed, for example, when the user makes a final selection at the bottom-most menu. Alternatively, information may be displayed and updated in a continuous manner as the user navigates through the menus, such as by performing step 518 while performing steps 512, 514, and 516. One example of displaying information is illustrated in FIG. 2. Other variations are possible.

Other Embodiments

The present invention allows for many variations and embodiments. For example, one embodiment would add object-relative questions (such as "why did Pac resize after Ghost moved"), which were fairly common in early observations of some programmers.

In reported user studies, using the latest execution of the queried statement was sufficient. In more complicated programs, this may not hold true. Another embodiment would allow programmers to further specify their questions with a time or repeat count, which would allow them to find a particular execution in the recent history. Another possibility would be to statistically categorize execution actions as either common or anomalous. This would reduce the number of choices presented to the programmer by only presenting the anomalous values in the menu. Another possibility would be to choose the most recent execution relative to the position of a time cursor in a visualization.

For particularly large programs, one way to automatically determine the granularity and nature of the program output being debugged would be to search for previous executions of code in recently modified source files. This analysis could be used to guide the selection a set of output statements for "Why did" and "Why didn't" questions that are likely to be relevant in a particular debugging context.

When a subject program displays output, either as graphical output in a Graphical User Interface program, or textual output to a console or debugging window, programmers can ask about particular program output by selecting the output and using a special signal such as a context-menu or special tool to ask "Why did this output get produced". For example, the user might click on a blue rectangle that is out of place to be shown the specific code that caused it to display in its current configuration. Another example would be when there are print statements in some networking code that sends the output to a text console, and the tool would allow the user to ask questions about particular output by just clicking on it.

Another option is to ask the question directly about a selected piece of source code. A special context-menu could be displayed over the code, or a special tool could be used to select the code in question, or else the code could be "dragged-and-dropped" onto the visualization window 301. The resulting answer would show why that piece of code did or did not recently get executed.

Another embodiment would include other questions, in addition to "Why did" and "Why didn't" in the question menu. For example, questions about "What happens when . . . " or "How does this work" could support programmers' understanding of unfamiliar code by allowing them to ask the tool about the causes of particular program behaviors. For example, if a programmer was trying to understand the operation that gets performed after a button is pressed, the tool could allow him to use a special signal such as a context-menu to select the button and ask, "What happens when this button is pressed?" The tool could then provide all of the code that was executed as a result of the button being pressed.

In another embodiment, the questions could be asked whenever the subject program was paused. For example, if the program stops due to an error or because a breakpoint was hit, all of the questions and visualizations would still be available to help the user debug.

Although the description has been discussed in terms of debugging, those skilled in the art will understand that the ability to ask questions about the execution of a program will also be useful for other tasks, such as understanding how an unfamiliar program works.

Figure 5:
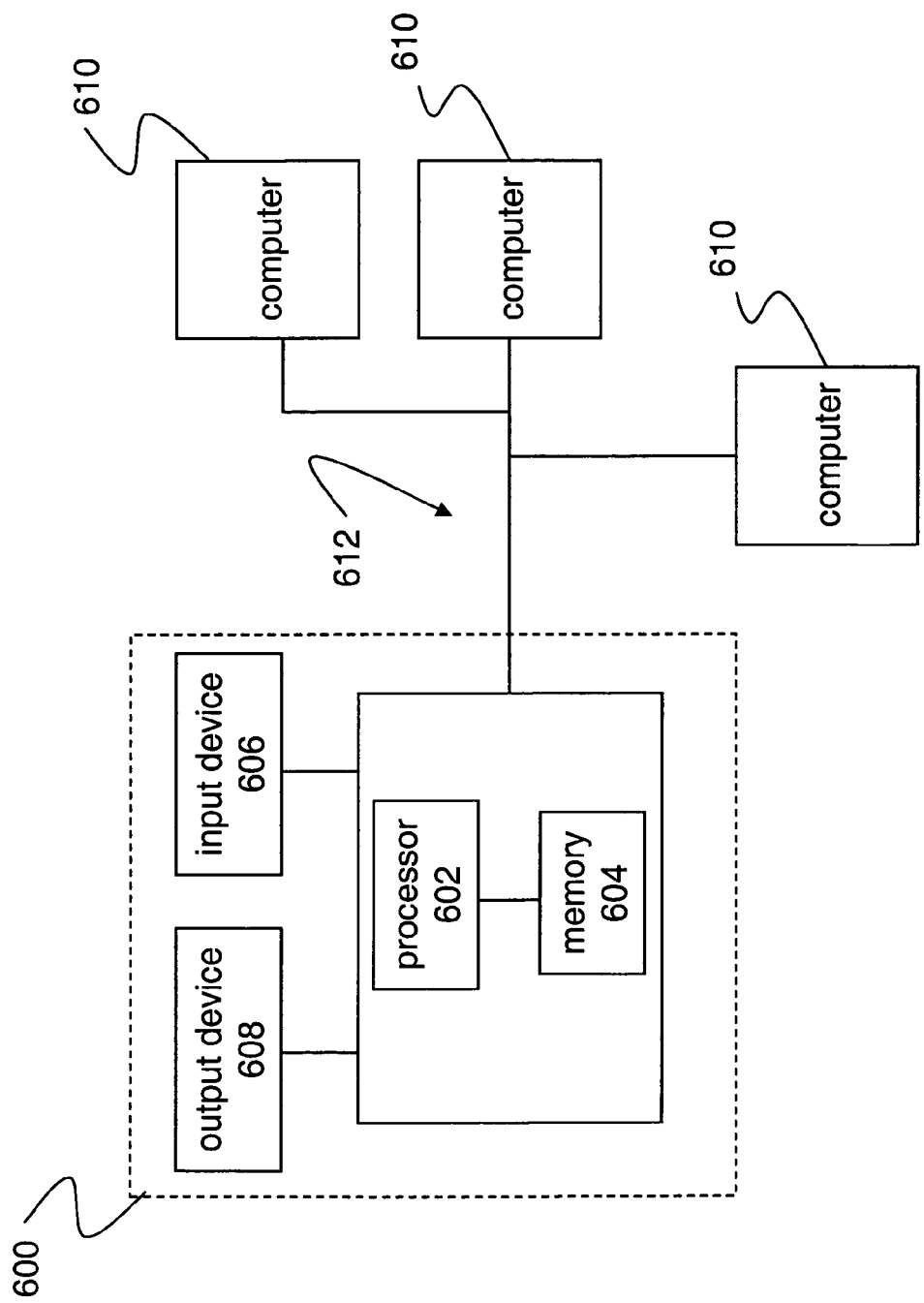
FIG. 5 is a block diagram illustrating one embodiment of a computer that may be used with the present invention.

FIG. 5 is a block diagram illustrating one embodiment of a computer 600 that may be used with the present invention. The computer 600 includes a processor 602 and memory 604, as well as an input device 606, such as a keyboard or mouse, and an output device 608, such as a monitor. The computer may include other devices, such as video adapters, data interface devices, device controllers, additional input and output devices, additional memory devices, and additional processors. The computer may be, for example, a general purpose computer, a special purpose computer, a computer system, or other variations of computers.

The present invention may be implemented on the computer 600 in various ways. For example, the present invention may be in the form of software residing in the memory 604. For example, the present invention may be in the form of software which is loaded or installed on non-removable memory 604 in the computer 600, or it may be in the form of removable memory 604, such as on a removable magnetic disk, a memory card, an optical disk, or other forms of removable memory. The present invention may also be in the form of software residing in memory in the processor 602, in memory in another part of the computer 600, or as part of one or more applications, tools, or programs stored or executed on the computer 600. Alternatively, the software may reside in a remote location, such as in one or more other computers 610 connected via one or more connections 612 such as the Internet or other networks. For example, a subject program may reside in one computer, while the debugger may reside in a different computer. This practice is sometimes known as "remote debugging". In such an embodiment, the invention may be used to practice remote debugging between two or more networked computers.

In one embodiment, the present invention is in the form of executable software on a removable memory which can be installed in memory 604 and executed on the computer 600. In another embodiment, the present invention is in the form of several separate pieces of software which are integrated with one or more applications on the computer 600, and that software is executed from its various locations as needed.

Regardless of how and where the software resides, when executed the software causes the processor 602 or one or more other devices to perform some or all of the processes described herein. While the invention has been particularly shown and described with reference to several embodiments thereof, it will be understood that various changes in form and detail may be made therein without departing from the spirit and scope of the invention. For example, although the present invention was generally described in terms of a "why" button, it may be implemented with a button labeled with a term or logo other than "why", or it may utilize a form other than a button, such as a desktop icon, an option in a larger menu system, or an object on the screen representing the subject program's output. Similarly, references to "clicking", "double clicking", menus, etc. are illustrative of the invention and are not limitations of the invention. In addition, although the first level menu was described in terms of offering "why did" and "why didn't" option, the first level menu may contain additional questions, such as "How", or it may contain other options in place of the questions. Similarly, the number of menus and submenus, and the number and type of options available at each menu and submenu may also vary. For example, in some embodiments only one or two levels of menus may be provided, and in other embodiments many levels may be provided. Those and other variations and modifications of the present invention are possible and contemplated, and it is intended that the foregoing specification and the following claims cover such modifications and variations.

What is claimed is:

1. A computer software tool stored in memory which, when executed, performs steps comprising:
   executing a subject program;
   recording a first statement responsible for a first variable changing, wherein recording the first statement is performed during execution of the subject program;
   recording a second variable used by a second statement that executed, wherein recording the second variable is performed during execution of the subject program;
   recording a third statement that caused the second statement to execute, wherein recording the third statement is performed during the execution of the subject program;
   pausing the execution of the subject program after executing the subject program, after recording the first statement, after recording the second variable, and after recording the third statement, wherein pausing the execution of the subject program is caused by a user intentionally pausing the execution of the subject program and wherein pausing is caused without breakpoints;
   prompting the user to select information related to the subject program after executing the subject program, after recording the first statement, after recording the second variable, after recording the third statement, and after pausing the execution of the subject program; and
   providing an answer in response to the user selecting information related to the subject program, wherein the answer includes at least one of: statements, variables, and prepared statements related to the information selected by the user, and wherein providing an answer includes:
   determining whether a statement of a subject computer program failed to execute because it is not possible for the statement to execute;
   providing an answer indicating why it is not possible for the statement to execute when it is determined that the statement failed because it is not possible for the statement to execute;
   determining whether a statement did execute;
   providing an answer indicating why the statement did execute when it is determined that the statement did execute;
   determining whether a statement can execute but did not execute;
   providing an answer indicating why the statement can execute but did not execute when it is determined that the statement can execute but did not execute.

2. The tool of claim 1, wherein providing an answer includes providing an answer referring to at least one of: statements that did not execute and variables that did not change.

3. The tool of claim 1, wherein providing an answer includes providing an answer referring to at least one of: statements that executed and variables that changed.

4. The tool of claim 1, wherein the first and second variables are the same.

5. The tool of claim 1, further comprising recording a value of the first variable prior to the first variable changing.

6. The tool of claim 1, wherein prompting the user includes prompting the user to select from a plurality of options including determining why an action occurred and determining why an action did not occur.

7. The tool of claim 1, further comprising:
   prompting the user to select one of the statements and variables in the answer; and
   providing a subsequent answer relating to the statement or variable selected by the user.

8. The tool of claim 1, further comprising recording a thread in which a statement is executed.

9. The tool of claim 1, wherein the user intentionally pausing the execution of the subject program results from the user pressing a button labeled "Why".

10. The tool of claim 1, wherein pausing the execution of the subject program results from the user clicking on a code fragment in the program editor.

11. The tool of claim 1, wherein at least one of the recording steps includes recording at least one of changes to objects, changes to variables, execution of assignment statements, and execution of animation statements.

12. The tool of claim 1, wherein the at least one of the recording steps is performed by interpreting statements.

13. The tool of claim 1, wherein the steps of recording include:
   instrumenting the subject program; and
   compiling the instrumented subject program.

14. The tool of claim 1, wherein providing an answer includes providing the user with information selected from a group comprising: determining why a statement executed, and determined why a statement did not execute.

15. A computer software tool stored in memory which, when executed, performs steps comprising:
   executing a subject program;
   recording a first statement responsible for a first variable changing, wherein recording the first statement is performed during execution of the subject program;
   recording a second variable used by a second statement that executed, wherein recording the second variable is performed during execution of the subject program;
   recording a third statement that caused the second statement to execute, wherein recording the third statement is performed during the execution of the subject program;
   pausing the execution of the subject program after recording the first statement, after recording the second variable, and after recording the third statement, and wherein pausing the execution of the subject program is caused by a user intentionally pausing the execution of the subject program and wherein pausing is caused without breakpoints;
   prompting the user to select program output of the subject program after executing the subject program, after recording the first statement, after recording the second variable, after recording the third statement, and after pausing the execution of the subject program, wherein program output is selected from a group comprising textual output and graphical output from the subject program; and
   providing an answer in response to the user selecting information related to the output of the subject program, wherein the answer includes at least one of: statements, variables, and prepared statements related to the information selected by the user, and wherein providing an answer includes:
      determining whether a statement related to the output of the subject program did execute;
      providing an answer indicating why the statement did execute when it is determined that the statement did execute.

16. A computer-implemented method for interrogating a subject program, comprising:
   executing the subject program;
   recording a first statement responsible for a first variable changing, wherein recording the first statement is performed during execution of the subject program;
   recording a second variable used by a second statement that executed, wherein recording the second variable is performed during execution of the subject program;
   recording a third statement that caused the second statement to execute, wherein recording the third statement is performed during the execution of the subject program;
   pausing the execution of the subject program after executing the subject program, after recording the first statement, after recording the second variable, and after recording the third statement, wherein pausing the execution of the subject program is caused by a user intentionally pausing the execution of the subject program and wherein pausing is caused without breakpoints;
   prompting the user to select information related to the subject program after executing the subject program, after recording the first statement, after recording the second variable, after recording the third statement, and after pausing the execution of the subject program; and
   providing an answer in response to the user selecting information related to the subject program, wherein the answer includes at least one of: statements, variables, and prepared statements related to the information selected by the user, and wherein providing an answer includes:
      determining whether a statement of a subject computer program failed to execute because it is not possible for the statement to execute;
      providing an answer indicating why it is not possible for the statement to execute when it is determined that the statement failed because it is not possible for the statement to execute;
      determining whether a statement did execute;
      providing an answer indicating why the statement did execute when it is determined that the statement did execute;
      determining whether a statement can execute but did not execute;
      providing an answer indicating why the statement can execute but did not execute when it is determined that the statement can execute but did not execute.

17. A computer-implemented method for interrogating a subject program, comprising:
   executing the subject program;
   recording a first statement responsible for a first variable changing, wherein recording the first statement is performed during execution of the subject program;
   recording a second variable used by a second statement that executed, wherein recording the second variable is performed during execution of the subject program;
   recording a third statement that caused the second statement to execute, wherein recording the third statement is performed during the execution of the subject program;
   pausing the execution of the subject program after recording the first statement, after recording the second variable, and after recording the third statement, wherein pausing the execution of the subject program is caused by a user intentionally pausing the execution of the subject program and wherein pausing is caused without breakpoints;
   prompting the user to select program output of the subject program after executing the subject program, after recording the first statement, after recording the second variable, after recording the third statement, and after pausing the execution of the subject program, wherein program output is selected from a group comprising textual output and graphical output; and
   providing an answer in response to the user selecting information related to the output of the subject program, wherein the answer includes at least one of: statements, variables, and prepared statements related to the information selected by the user, and wherein providing an answer includes:
      determining whether a statement related to the output of the subject program did execute;

providing an answer indicating why the statement did execute when it is determined that the statement did execute.

18. The computer software tool of claim 1, wherein prompting a user to select information related to the subject program includes prompting the user to select program output of the subject program, wherein program output is selected from a group comprising textual output and graphical output.

19. The computer software tool of claim 15, wherein:
pausing the execution of the subject program is performed after executing the subject program, after recording the first statement, after recording the second variable, and after recording the third statement; and
prompting the user to select program output of the subject program is performed after executing the subject program, after recording the first statement, after recording the second variable, after recording the third statement, and after pausing the execution of the subject program.

20. The computer-implemented method of claim 17, wherein:
pausing the execution of the subject program is performed after executing the subject program, after recording the first statement, after recording the second variable, and after recording the third statement; and
prompting the user to select program output of the subject program is performed after executing the subject program, after recording the first statement, after recording the second variable, after recording the third statement, and after pausing the execution of the subject program.

* * * * *